(12) United States Patent
Söderqvist

(10) Patent No.: US 6,526,924 B2
(45) Date of Patent: Mar. 4, 2003

(54) PORTABLE, HAND-OPERATED WORKING MACHINE

(75) Inventor: Magnus Söderqvist, Mölndal (SE)

(73) Assignee: Aktiebolaget Electrolux (publ), Stockholm (SE)

( * ) Notice: Subject to any disclaimer, the term of this patent is extended or adjusted under 35 U.S.C. 154(b) by 0 days.

(21) Appl. No.: 09/901,091

(22) Filed: Jul. 10, 2001

(65) Prior Publication Data

US 2002/0004990 A1 Jan. 17, 2002

(30) Foreign Application Priority Data

Jul. 12, 2000 (SE) .............................. 0002644

(51) Int. Cl.[7] .............................. B27B 9/00
(52) U.S. Cl. .................................. 123/41.65
(58) Field of Search ................. 30/389; 123/41.65, 123/41.11

(56) References Cited

U.S. PATENT DOCUMENTS 2,550,223 A * 4/1951 Carlin et al. ................ 290/1 C
3,659,471 A * 5/1972 Marsch ................... 123/41.11
5,855,067 A * 1/1999 Taomo et al. ................. 30/122

* cited by examiner

Primary Examiner—Gene Mancene
Assistant Examiner—Hyder Ali
(74) Attorney, Agent, or Firm—Michael D. Bednarek; Shaw Pittman LLP

(57) ABSTRACT

The invention relates to a portable, hand-operated working machine (1) with a tool which is rotatable by an engine through a driving shaft (20), and a transmission comprising a centrifugal coupling, a driving belt (8) and a driving wheel with a groove (7) for the driving belt fitting in said groove, which driving wheel comprises an outer (3) and an inner (4, 4') half of the driving wheel, wherein the outer half (3) of the driving wheel consists of an inner wall of a coupling drum (11) being part of the centrifugal coupling, which drum is rotated by the driving shaft when the centrifugal coupling is in the operative state. The characteristic feature of the invention is that a fan (14) is provided inside the driving belt in the axial direction, coaxially to the driving shaft, and arranged to rotate at least when the centrifugal coupling is in the operative state, which fan has fan blades (15) extending at least partly radially beyond said groove for the driving belt, which fan blades are designed to suck cooling air in the axial direction towards the space outside said groove for the driving belt and towards the drum of the centrifugal coupling.

10 Claims, 3 Drawing Sheets

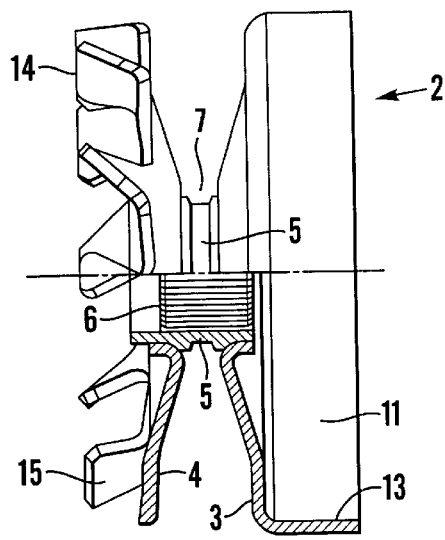
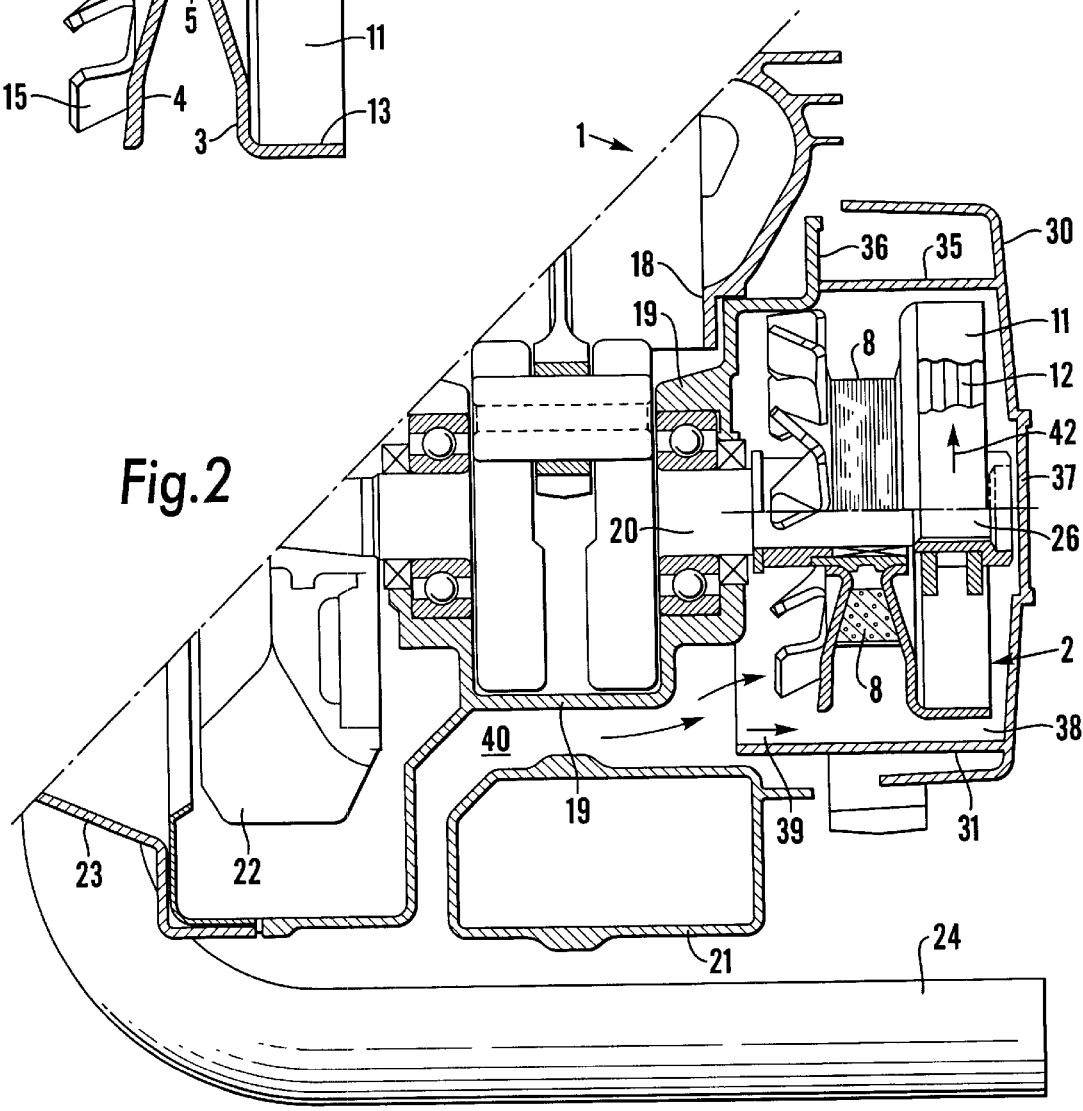

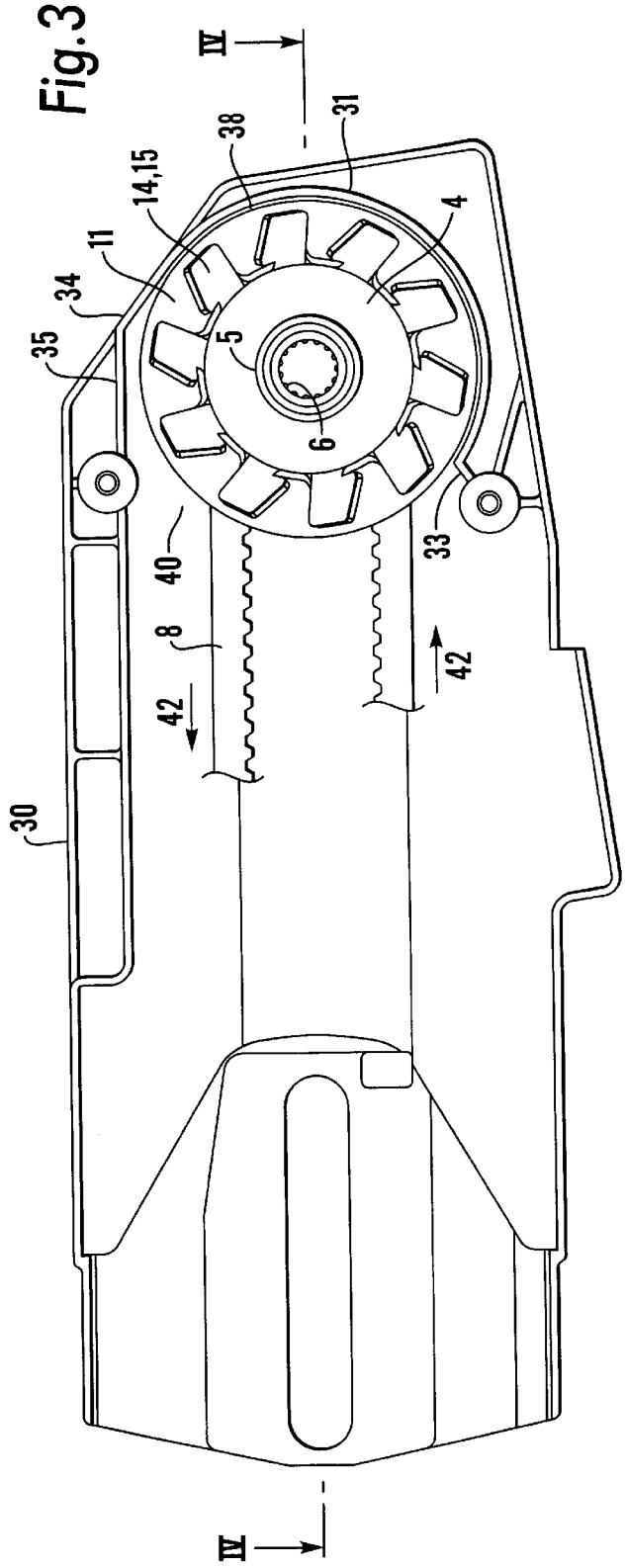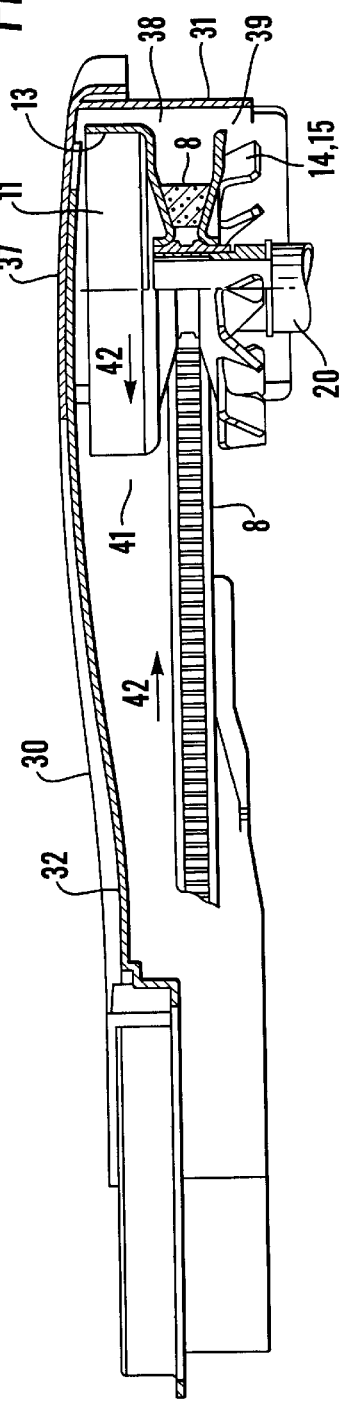

PORTABLE, HAND-OPERATED WORKING MACHINE

TECHNICAL FIELD

The invention relates to a portable, hand-operated working machine with a tool which is rotatable by an engine through a driving shaft, and a transmission comprising a centrifugal coupling, a driving belt, and a driving wheel with a groove for the driving belt fitting in said groove, which driving wheel comprises an outer and an inner half of the driving wheel, wherein the outer half of the driving wheel consists of an inner wall of a coupling drum being part of the centrifugal coupling, which drum is rotated by the driving shaft when the centrifugal coupling is in an operative state. The invention especially relates to a portable, hand-operated cutting machine or circular saw with a tool consisting of abutting or sawing blade, which e.g. may be a conventional sawing blade or an annular blade provided with diamond segments.

The invention also relates to a machine element which may be a part of the working machine. The invention has been developed in order to master problems with the machines of the above mentioned type, wherein the driving belt is of the V-belt type and the driving wheel has a wedge-shaped groove fitting the driving belt, but it is not limited to said application but may also be used with machines having other types of driving belts, e.g. so called poly-V-belts.

TECHNICAL FIELD

Driving belts of the V-type for working machines of the above mentioned type are subjects to heavy stresses. A problem is especially heavy heating of the driving belt, which implies that the driving belt often gets a very short duration time. The heating of the driving belt depends, partly on friction between the driving belt and the driving wheel, and the driving pulley, respectively, partly on heating of the coupling drum of the centrifugal coupling because of slipping of the coupling shoes in the drum, partly on the heat from the engine, when it is the question of an internal combustion engine. The heat which is developed in the coupling drum, being an integrated part of the driving wheel, is transmitted to the driving belt. According to prior art, different measures have been suggested to counteract the heating of the driving belt. It is for instance known to provide air openings in the belt cover, which is conventionally provided in the form of a driving belt cover at a distance from the driving belt and the centrifugal coupling, but none of said known devices for cooling the driving belt has given the desired result.

DISCLOSURE OF THE INVENTION

The object of the invention is to address the above mentioned problems. The characterising feature of the invention is that a fan is provided inside the driving belt, as viewed in the axial direction, coaxially to the driving shaft and arranged to rotate at least when the centrifugal coupling is in the operative state, which fan has fan blades extending at least partly radially beyond said groove for the driving belt, which fan blades are designed to suck cooling air in the axial direction towards the space outside said groove for the driving belt and towards the drum of the centrifugal coupling.

According to one embodiment, the inner driving wheel half is an integrated, inner portion of the fan, as viewed in the radial direction, while the fan blades form outer, periphery portions of the driving wheel half. Preferably, the two halves of the driving wheel are connected to each other, e.g. through a sleeve being journalled on the driving shaft, which is rotatable also when the driving wheel and the fan do not rotate or rotate at a lower speed, when the centrifugal coupling is in the non-operative condition or slips. In addition to the cooling air directly cooling the driving belt, or counteracting heating of the driving belt through cooling the coupling cover, said embodiment has the advantage that the manufacturing costs are reduced and that the assembly is simplified, as the coupling cover, the driving wheel, and the fan constitute an integrated unit.

According to another embodiment of the invention the fan is a separate unit provided inside the inner driving wheel half, as viewed in the axial direction, between the inner driving wheel half and the engine. Also in this case, the driving wheel is journalled on the driving shaft, which is rotatable when the driving wheel does not rotate or rotates at a lower speed, when the centrifugal coupling is not in the operative state or slips, while the fan, being a separate unit, may be fixedly mounted, i.e. not journalled on the driving shaft, to rotate together with driving shaft also when the engine is running but the centrifugal coupling is not in the operative state or slips. Said embodiment has the advantage that the fan cools the driving belt and the coupling drum also when the engine runs idle, and the driving shaft rotates at a lower speed as well as when the centrifugal coupling slips and develops heat in the coupling drum because of friction between the coupling shoe and the drum. The embodiment, where the fan is a separate unit provided inside the inner driving wheel half, does, however, not exclude that the fan also in this case is integrated with the driving wheel and forms an integrated unit, e.g. that both the driving wheel and the fan are mounted on a common sleeve being journalled on the driving shaft, which facilitates the assembly.

Further, according to an aspect of the invention, a driving belt cover is provided with a chamber being defined by a portion of the driving belt cover outside the driving belt and the centrifugal coupling, and by a shield wall extending around a portion of the centrifugal coupling and the driving wheel at least behind the centrifugal coupling and the driving wheel, but which chamber is open for the driving belt in the forward direction. According to this aspect of the invention, the centrifugal coupling and the driving wheel are provided in said chamber, and the fan is arranged to drive at least a partial flow of the cooling air into said chamber and therefrom further forwards inside the driving belt cover to further improve the cooling effect of the cooling air on the driving belt directly and indirectly by cooling the coupling drum. Preferably, the driving belt cover is made without any apertures, slots or the like in its wall with the purpose that the cooling air shall be driven into said chamber substantially in the axial direction towards the region outside the driving belt groove and towards the coupling drum and further from said chamber at least as a partial flow forwards along the driving belt inside the driving belt cover.

Further aspects and features of the invention will be apparent from the following description of the preferred embodiments.

BRIEF DESCRIPTION OF DRAWINGS

In the following, detailed description of the invention reference is made to the appending drawings, of which FIG. 1 is a view, partially in cross section, of a machine element, which according to a preferred embodiment is included in the working machine according to the invention;

FIG. 2 shows a portion of a working machine in a vertical section coinciding with the centre of rotation of the driving shaft;

FIG. 3 is a side view showing, in a vertical direction, the inside of a driving belt cover, the driving belt, and the machine element according to the invention;

FIG. 4 is a view along the line IV—IV in FIG. 3 showing the driving belt cover in cross section and the machine element according to the invention partially in cross section.

DETAILED DESCRIPTION OF THE INVENTION

Figure 5:
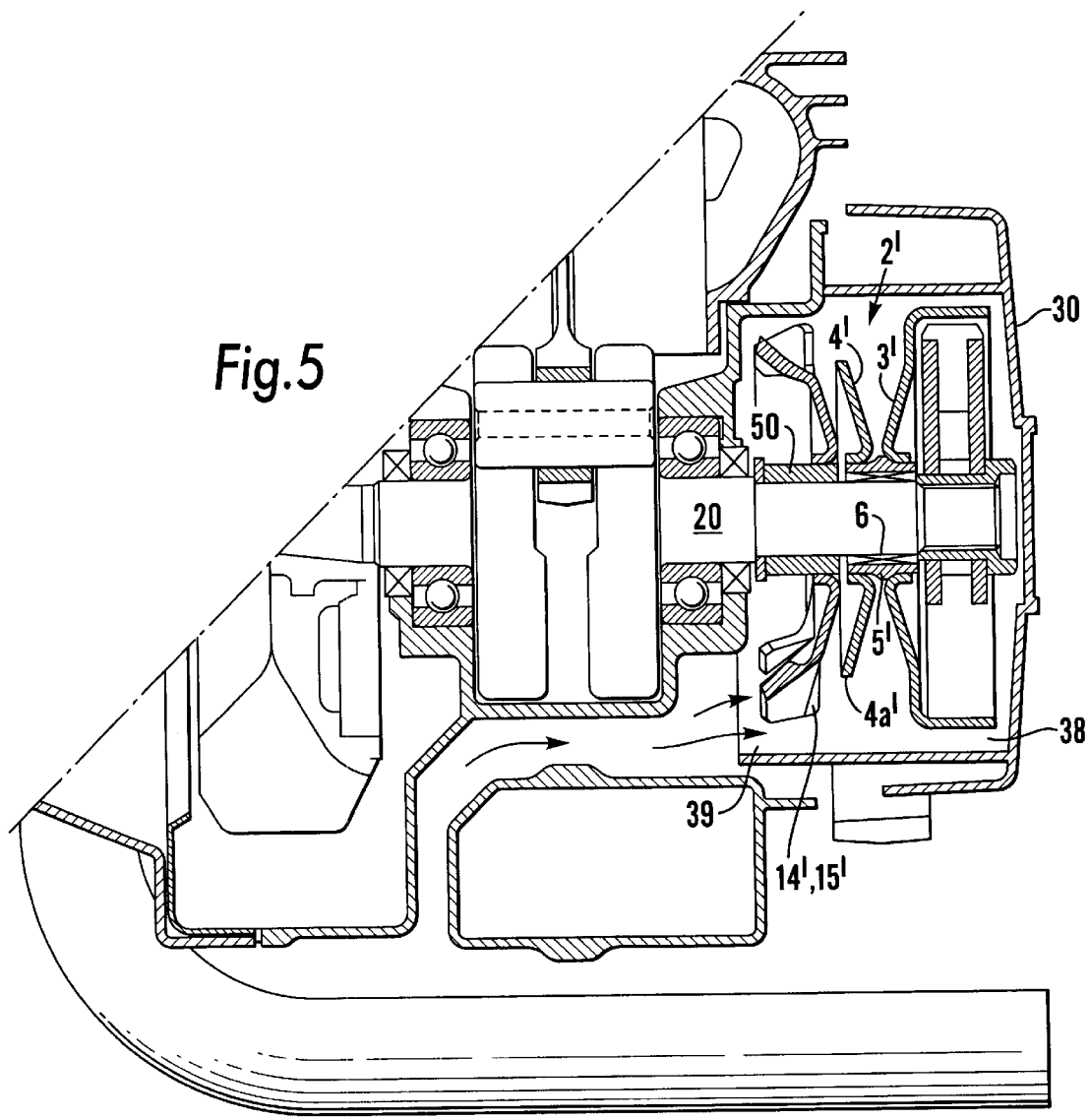
FIG. 5 shows a second embodiment of the invention in a vertical section through the working machine through the centre of rotation of the driving shaft.

In the drawings, a working machine is generally designated 1, and a machine element according to a preferred embodiment of the invention is generally designated 2.

The machine element 2 is an integrated driving wheel with a wedge-shaped groove 7 for a driving belt 8 of the V-type, FIG. 2, a coupling drum 11 for a centrifugal coupling of the conventional type with coupling shoes 12, and a fan 14. In FIG. 1, an additional driving wheel half is designated 3, and an inner driving wheel half is designated 4. The two driving wheel halves 3, 4 are soldered to a common sleeve (bushing) 5, into which a cylindrical needle bearing 6 is pressed. The outer driving wheel half 3 is formed in a manner known per se by the inner end wall of the coupling drum 11, the cylindrical portion of which has been designated 13, and against which the coupling shoes 12 are pressed, when the coupling is in the operative state. The fan 14 is formed by the fan blades 15 on the inner periphery of the driving wheel half 4. The fan blades 15 are twisted, so that cooling air is driven outwards, i.e. to the right with the reference to FIGS. 1 and 2., towards the space outside the wedge-shaped groove 7 and further towards the coupling drum 11.

The working machine 1, wherein a portion of its engine part is shown in FIG. 2, comprises in the present case, a cutting machine with a cutting blade (not shown), but may generally comprise any portable, hand-operated working machine with a tool which is rotatable by an engine through a driving shaft, and a transmission comprising a centrifugal coupling, a fan, and a driving wheel with a wedge-shaped groove for a driving belt of the V-type. In principle, the driving engine may be an engine of any type, e.g. a hydraulic engine, an electric engine, or an internal combustion engine, but in the present case the engine is an internal combustion engine with an engine cylinder 18, an engine housing (crankcase) 19, a crank shaft 20 (below referred to as a driving shaft 20), fuel tank 21, engine fan 22, and a fan housing, also called starter housing, 23. These elements are of the conventional type like the other elements of the engine assembly, which are not mentioned in this description. A conventional foot rest is designated 24.

The machine element 2 is through the needle bearing 6 rotatably mounted on the driving shaft 20 outside the crankcase 19, which shows a cylindrical protrusion 25 extending into the fan 14 radially inside the fan blades 15 to a short distance from the inner driving wheel half 4. The assembly, in which the coupling shoes 12 in the centrifugal coupling are included, is in a conventional manner mounted on the driving shaft journal 26 inside the coupling drum 11.

With reference to FIG. 3 and FIG. 4, a driving belt cover is generally designated 30. Said cover consists of a plastic housing at the right side of the working machine, the primary function of which is to protect the driving belt 8 and the centrifugal coupling, but it has been designed, and this refers especially to the rear portion of the belt cover 30, to functionally interact with the fan 14 in order to promote the cooling of the driving belt 8, partly directly by means of the cooling air from the fan 14, partly indirectly by cooling the coupling drum 11. Therefore, the belt cover 30 in its rear portion is provided with a shield 31 having the form of a portion of a cylinder extending inwardly from the side wall 32 of the belt cover 30. The shield 31 extends from a position 33 downwards, rearwards, and upwards along, and at a short distance from the fan 14 and the coupling drum 11, about 180° to a position 34. Then, the shield continues with a straight portion 35. When the belt cover 30 is mounted on the machine 1, the straight shield portion 35 abuts a portion 36 of the crankcase 90, FIG. 2. Thus, a chamber 38 is formed by the circular-cylindrical portion of the shield 31 between the positions 33 and 34, the straight shield portion 35, the crankcase 19, and a portion 37 of the belt cover 30 outside the machine element 2. The chamber 38 has a suction port 39 for cooling air from a space 40 below the crankcase 19. In the forward direction, the chamber 38 has an outlet port 41 for consumed cooling air, said port 41 also forming a passage for the driving belt 8.

The described machine 1 with the machine element 2 journalled on the driving shaft 20 operates with reference to the desired cooling of the driving belt 8 in the following way. When the working machine 1 is in operation, and the driving shaft 20 has a rotation speed which is suitable for the work, the coupling shoes 12 of the centrifugal coupling in a conventional manner lie pressed against the inside of the cylindrical portion 13 of the coupling drum 11, whereby the coupling drum 11 and hence the entire machine element 2 is rotated in the direction of the arrow 42. This causes the fan 14 with the fan blades 15 to suck air from the space 40 through the suction port 39 into the chamber 38 substantially in the axial direction towards the space outside the wedge-shaped groove 7 and towards the coupling drum 11. By means of this substantially axial transmission and by means of the turbulence created in the chamber 38, the driving belt 8 and the coupling drum 11 are cooled. The cooling of the coupling drum 11 may be as important as the direct cooling of the driving belt, as the coupling drum 11 in certain cases may be heavily heated by the friction heat because of slippage between the coupling shoes 12 and the cylindrical portion of the coupling drum 13, which friction heat is partly transferred to the driving belt 8. From the chamber 38, the cooling air is driven forwards inside the belt cover 30 along the driving belt 8 and cools the driving belt 8 also during this phase.

According to the embodiment of FIG. 5, a machine element 2', known per se, is used, comprising a driving wheel with an outer driving wheel half 3' formed by a portion of the inner end wall of the coupling drum 11, i.e. in the same way as in the machine element 2 according to the previous embodiment, and an inner driving wheel half 4'. The two driving wheel halves 3' and 4' are soldered to form a common sleeve 5', which is mounted through a needle bearing 6 to the driving shaft 20. The fan 14' has the same design as according to the previous embodiment but forms a separate unit, which is soldered to a sleeve 50, which in turn is fixedly pressed, or in any other way journalled, on the driving shaft 20 to rotate together with the shaft when the engine runs. The fan blades 15' extend outwards beyond the outer, circumferential edges 4a' of the inner driving wheel half 4'. The embodiment does not has the advantage that the fan, the driving wheel, and the coupling drum form an integrated unit, but on the contrary it has the advantage that the fan 14' rotates with the shaft 20 also when the engine is idle and when the coupling shoes 12 possibly slip against the coupling drum 11, so that the fan 14' with the fan blades 15 drives cooling air beyond the inner driving wheel half 4' and cools the driving belt 8 and the coupling drum 11, also during said conditions. In other respects, the design with reference to flow passages and the chamber 38 is the same as in the previous embodiment.

Also a third variant is conceivable, wherein the arrangement is the same as in FIG. 5 but the sleeve 5' is lengthened in the direction towards the engine, and the fan 14' is soldered or in any other way mounted to the extended sleeve and hence integrated with the coupling drum 11 and designed to be driven only when the coupling shoes 14 of the centrifugal coupling are actively pressed against the coupling drum.

I claim:

1. A portable, hand-operated working machine (1) with a tool which is rotatable by an engine through a driving shaft (20), and a transmission comprising a centrifugal coupling, a driving belt (8) and a driving wheel with a groove (7) for the driving belt fitting in said groove, which driving wheel comprises an outer (3) and an inner (4, 4') half of the driving wheel, wherein the outer half (3) of the driving wheel consists of an inner wall of a coupling drum (11) being part of the centrifugal coupling, which drum is rotated by the driving shaft when the centrifugal coupling is in an operative state, characterised in that a fan (14) is provided inside the driving belt in the axial direction, coaxially to the driving shaft, and arranged to rotate at least when the centrifugal coupling is in the operative state, which fan has fan blades (15) extending at least partly radially beyond said groove for the driving belt, which fan blades are designed to suck cooling air in the axial direction towards the space outside said groove for the driving belt and towards the drum of the centrifugal coupling.

2. A machine according to claim 1, characterised therein that the inner driving wheel half comprises an integrated, inner radial portion of the fan, while the fan blades (15) form outer, periphery portions of the driving wheel half.

3. A machine according to claim 2, characterised in that the two halves of the driving wheel are connected to each other and journalled on the driving shaft, which is rotatable also when the driving wheel and the fan do not rotate or rotate at a lower speed, when the centrifugal coupling is in a non-operative condition or slips.

4. A machine according to claim 3, characterised in that the two wheel halves are connected to each other by a sleeve (5), which is journalled on the driving wheel.

5. A machine according to claim 1, characterised in that the fan (14') is a separate unit provided inside the inner driving wheel half, as viewed in the axial direction, between the inner driving wheel half and the engine, and which fan has fan blades (15') extending beyond the outer, circumferential edge (4a') of the inner driving wheel half (4').

6. A machine according to claim 5, characterised in that the driving wheel is journalled on the driving shaft, which is rotatable when the driving wheel does not rotate or rotates at a lower speed, when the centrifugal coupling is in the non-operative state or slips, while the fan (14') being a separate unit is fixedly, i.e. not journalled, mounted on the driving shaft to rotate therewith also when the engine runs but the centrifugal coupling is not in the operative state or slips.

7. A machine according to claim 1, characterised in that the centrifugal coupling and the driving wheel are provided in a chamber (38) being defined by a portion (37) of a driving belt cover (30) outside the driving belt and the centrifugal coupling, and by a shield wall (31) extending around a portion of the centrifugal coupling and the driving wheel at least behind the centrifugal coupling and the driving wheel but being open for the driving belt in the forward direction, wherein the fan is arranged to drive at least a partial flow of the cooling air in said chamber and therefrom further forwards along the driving belt inside the driving belt cover.

8. A machine according to claim 7, characterised in that said shield also extends around a portion of the centrifugal coupling and the driving wheel on the bottom side of said elements.

9. A machine according to claim 7, characterised in that a portion (35) of said shield abuts a wall (36) being part of the engine.

10. A machine according to claim 1, characterised in that the driving belt is of the V-type, and that the groove for the driving belt in the driving wheel is wedge-shaped.

* * * * *